March 19, 1929.    K. W. CANNON ET AL    1,705,898
SMOKER'S ARTICLE
Filed March 29, 1926
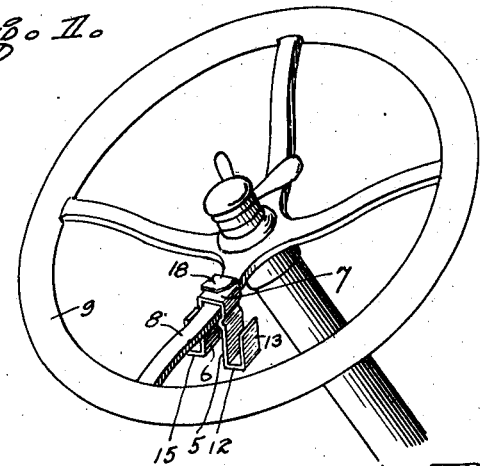
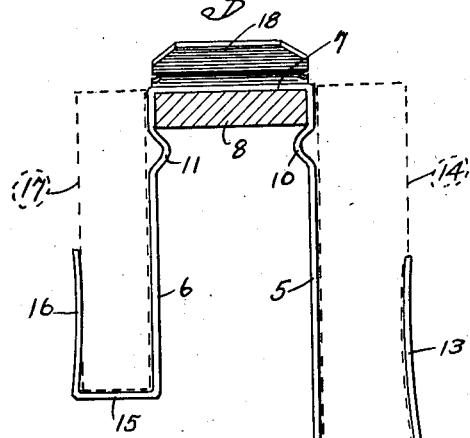
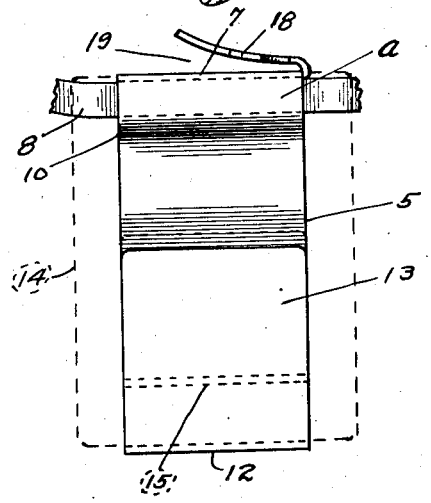
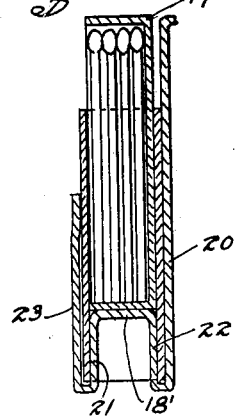
Inventor
KINGSLEY W. CANNON
FREDERICK G. E. LANGE
By
Attorneys.

Patented Mar. 19, 1929.

1,705,898

UNITED STATES PATENT OFFICE.

KINGSLEY W. CANNON AND FREDERICK G. E. LANGE, OF SAN FRANCISCO, CALIFORNIA.

SMOKER'S ARTICLE.

Application filed March 29, 1926. Serial No. 98,248.

The present invention relates to smokers' articles adapted for use in connection with motor vehicles. The purpose of the present invention is to provide a device that is adapted for connection to the steering wheel of a motor vehicle, and constructed for supporting within easy reach of the driver a package of matches and a package of tobacco, the latter being in the form of cigars or cigarettes.
The invention further proposes to provide an accessory for motor vehicles in the form of a smoker's article which is adapted to be operated by the driver for extinguishing the lighted ends of cigars or cigarettes preparatory to discarding the same.

The above and other objects are accomplished by instrumentalities pointed out in the following specification.

The invention is clearly defined in the claim.

A satisfactory embodiment of the invention is illustrated in the accompanying drawings forming part of the specification and in which Figure 1 is a perspective of the device in use.

Figure 2 is an end elevation of the device as the same appears when attached to the spoke of a steering wheel.

Figure 3 is a view at right angles to Figure 2, and

Figure 4 is a vertical cross section taken through one side portion of the device and showing a modified form of match box supporter.

The body $a$ of the accessory, in the form of a smoker's article, of the present invention is preferably formed of metal and may be in one piece and stamped from a blank. The metal of which body $a$ is formed is resilient so as to allow of tensioning the body and thereby enable the same to frictionally bind on a support and further to frictionally bind on the packages carried thereby so as to prevent accidental displacement of the body and the packages carried thereby. For purposes of illustration I have shown the body $a$ as being substantially inverted U-shape in end elevation. The limbs 5 and 6 are held spaced apart by the cross piece 7 for a distance corresponding to the transverse length of one of the spokes 8 of an ordinary motor vehicle steering wheel 9.

By preference the limbs 5 and 6 normally converge toward their free ends so that it is necessary to spread apart the free end portions of the limbs in the operation of introducing the spoke 8 into the intervening space between the limbs. In this way the limbs 5 and 6 are tensioned when disposed on opposite sides of spoke 8, and this tension causes the limbs to frictionally bind on opposite sides of the spoke so as to prevent accidental displacement of the body $a$.

Suitable beads 10 and 11 are provided on the inner faces of the limbs 5 and 6 and located adjacent to the cross piece 7. These beads result from stamping transverse depressions in the outer faces of the sides. The beads are disposed so as to extend underneath the lower face of spoke 8 so that their presence prevents accidental upward displacement of the body $a$ in response to upward springing movement of the vehicle when the device is in use.

It is to be noted that the length of limb 5 is greater than limb 6 and this length conforms substantially to the corresponding dimension of an ordinary package of cigarettes. 12 and 13 respectively indicate the side portions of a right angular extension extending outwardly and upwardly from the terminal of limb 5 and cooperating with the outer face of limb 5 to provide a pocket into which one end portion of an ordinary size package 14 of cigarettes or the like may be conveniently inserted. The upwardly extending side portion 13 of the extension curves inwardly and is adapted to be moved outward and thereby tensioned upon the insertion of the package 14. In this way sufficient pressure is exerted by the side 13 upon the package 14 to prevent accidental displacement thereof.

15 and 16 respectively indicate the sides of a right angular extension disposed at the free end of limb 6. The side 16 cooperates with limb 6 to provide a pocket adapted for receiving one end portion of an ordinary package of matches 17. The pocket is so constructed that when the package 17 is arranged upright therein, the side portion 16 operates to exert sufficient pressure on the package to prevent accidental displacement thereof. In this connection it is to be noted that the side portion 16 is curved inwardly and outwardly for the purpose of exerting pressure on the package 17.

18 is an extinguisher in the form of a metallic plate disposed so as to extend over the portion 7 of body $a$. The plate is secured at one end to one side of body 7, and is constructed so as to incline upwardly whereby an intervening space 19 is provided. The plate is formed of resilient metal and space 19 is such as to permit the ready insertion thereinto of the ignited end of a cigar or cigarette. It is evident that when the plate is pressed downwardly by the thumb or finger of the driver, the ignited end of a cigarette or cigar arranged in space 19 is readily extinguished by the action of the plate in crushing and disintegrating the said ignited end. When plate 18 is released and assumes its normal position as shown in Figures 2 and 3, the cigar or cigarette may be readily withdrawn from the space 19 and discarded.

In the form of the device shown in Figure 4, the pocket provided for the package of matches 17 is constructed so that the upper end portion of the slidable member of the package may be projected above the outer or sleeve portion. This is accomplished by constructing the side portion 18' of the right angular extension of the limb 20 so as to present an inverted U-shape in end elevation or vertical cross section. In this connection, it will be observed that the limbs 21 and 22 of the inverted U are in spaced relation to the adjacent faces of the limb 20, and the upright side portion 23, the intervening spaces being provided for the reception of one end portion of the outer sleeve of the package 17.

From the foregoing it is to be observed that the device of the present invention is of simple construction and may be manufactured at very low cost. This construction is such that when it is connected to one of the spokes of the driving wheel, ready access to the matches or to the package of tobacco 14 may be had by the driver. It is to be further noted that the construction is such as not to require any forward leaning movement or other displacement of the body of the driver in obtaining a cigarette or a match, that would interfere with the operation of the steering wheel, or require the driver to look away from the road.

Although we have shown and described one embodiment of our invention, it is to be understood that the same is susceptible of various changes; and we reserve the right to employ such as may come within the scope of the appended claim.

We claim:

A smoker's article comprising a base plate having a flat turned back upon the same and tapering away therefrom so as to allow a cigarette inserted between the plate and the flap to be extinguished and means extending downwardly from the base plate and within the vertical confines thereof for clamping the same in directly overlying relation to the spoke of a steering wheel.

KINGSLEY W. CANNON.
FREDERICK G. E. LANGE.